United States Patent [19]

Karlsson et al.

[11] Patent Number: 5,777,757
[45] Date of Patent: Jul. 7, 1998

[54] METHOD AND SYSTEM FOR HALFTONING

[75] Inventors: Magnus L. Karlsson, Milpitas; Kok S. Chen, Sunnyvale, both of Calif.

[73] Assignee: Apple Computer, Inc., Cupertino, Calif.

[21] Appl. No.: 464,925

[22] Filed: Jun. 5, 1995

[51] Int. Cl.$^6$ .............................. H04N 1/40; G06K 9/36
[52] U.S. Cl. .................... 358/456; 358/298; 358/429; 358/455; 358/465; 358/457; 358/534; 358/535; 358/536; 382/237; 382/270
[58] Field of Search ......................... 358/298, 296, 358/429, 454, 455, 459, 465, 533, 534, 535, 536, 457, 458, 462; 395/101, 109; 382/237, 270, 266

[56] References Cited

U.S. PATENT DOCUMENTS

| | | | |
|---|---|---|---|
| 3,937,878 | 2/1976 | Judice | 178/7.3 D |
| 4,884,080 | 11/1989 | Hirahara et al. | 346/46 |
| 4,903,123 | 2/1990 | Kawamura | 358/454 |
| 5,050,000 | 9/1991 | Ng | 358/298 |
| 5,107,349 | 4/1992 | Ng et al. | 358/457 |
| 5,305,118 | 4/1994 | Schiller et al. | 358/456 |
| 5,469,515 | 11/1995 | Lin | 358/467 |
| 5,602,943 | 2/1997 | Velho et al. | 382/266 |

FOREIGN PATENT DOCUMENTS

| | | |
|---|---|---|
| 0240202 | 10/1987 | European Pat. Off. . |
| 0291300 | 11/1988 | European Pat. Off. . |
| 0427380 | 5/1991 | European Pat. Off. . |
| 0682438 | 11/1995 | European Pat. Off. . |

*Primary Examiner*—Edward L. Coles, Sr.
*Assistant Examiner*—Mark Wallerson
*Attorney, Agent, or Firm*—Nancy R. Simon

[57] ABSTRACT

A system and method for halftoning multi-level pixels preferably uses a threshold array divided into two or more classes. The classes are ordered in a visitation order. Each class contains at least one element. A halftone cell comprised of a plurality of pixels corresponds to the threshold array. As the intensity level for the halftone cell increases, the pixels corresponding to the elements in the first class are halftoned by fractional values of pixels until all of the pixels in that class reach saturation. As the intensity of the halftone cell increases, none of the pixels corresponding to the elements in any other class change state. Once the pixels corresponding to the elements in the first class are saturated, the pixels corresponding to the elements in the second class are halftoned by fractional values of pixels. In more general terms, the next class in the class visitation order is not addressed until the pixels corresponding to all of the elements in the previous class are saturated.

33 Claims, 10 Drawing Sheets

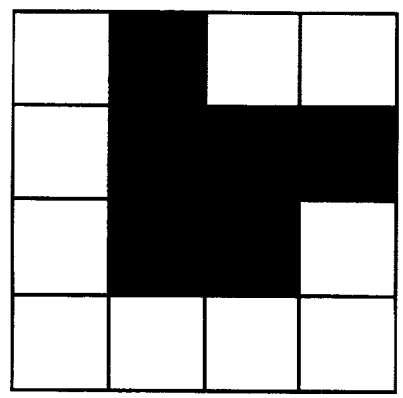
Figure 1 - Prior Art
Figure 2 - Prior Art

| $0_0$ | $3_1$ | $2_2$ | $0_0$ | $3_1$ | $2_2$ |
| $1_0$ | $0_1$ | $3_2$ | $1_0$ | $0_1$ | $3_2$ |
| $2_0$ | $1_1$ | $0_2$ | $2_0$ | $1_1$ | $0_2$ |
| $3_0$ | $2_1$ | $1_2$ | $3_0$ | $2_1$ | $1_2$ |
| $0_0$ | $3_1$ | $2_2$ | $0_0$ | $3_1$ | $2_2$ |
| $1_0$ | $0_1$ | $3_2$ | $1_0$ | $0_1$ | $3_2$ |
| $2_0$ | $1_1$ | $0_2$ | $2_0$ | $1_1$ | $0_2$ |
| $3_0$ | $2_1$ | $1_2$ | $3_0$ | $2_1$ | $1_2$ |

900

| $3_4$ | $0_1$ | $0_2$ | $0_4$ |
|---|---|---|---|
| $3_2$ | $0_0$ | $1_0$ | $1_1$ |
| $3_1$ | $3_0$ | $2_0$ | $1_2$ |
| $2_4$ | $2_2$ | $2_1$ | $1_4$ |

| $6_7$ | $0_2$ | $0_3$ | $1_4$ |
|---|---|---|---|
| $6_3$ | $0_0$ | $1_0$ | $1_2$ |
| $3_2$ | $1_1$ | $0_1$ | $2_3$ |
| $5_6$ | $4_3$ | $2_2$ | $3_5$ |

METHOD AND SYSTEM FOR HALFTONING

BACKGROUND OF THE INVENTION

1. Field of the Invention

The present invention relates generally to the field of image reproduction, and more particularly to digital halftoning. Still more particularly, the present invention relates to a method and apparatus for halftoning multi-level pixels.

2. Description of the Prior Art

A printed color image is a field of tiny dots of typically only four colors of ink arranged meticulously so as to replicate the multiplicity of colors within the color image. Since only four colors of inks are available, it is generally not possible to reproduce a color image exactly like its original. But exact duplication is not necessary. One need only create a believable image, and the human eye and brain will compensate for differences in illumination, color surroundings and tonal range.

Tonal range is important in creating a believable image. Some imaging devices are capable of reproducing acceptable tone directly. Examples of such devices include photography and television. These types of imaging devices can produce continuous tone, or "contone."

Other imaging devices are not able to reproduce acceptable tone directly. These types of devices are typically "binary" or "bi-level" devices and multi-level devices. Bi-level devices produce at any output position only two values; one value corresponds to "on", the other value to "off." One example of a bi-level device is a dot matrix printer. Multi-level devices typically have more than two output values but not as many output values as contone devices. In other words, multi-level devices are devices that have M output values for N input values, where N>M.

Bi-level and multi-level devices have limited tonal range. Intermediate tones, such as varying shades of gray, must be represented by halftones. Halftoning is a process by which continuous-tone images are approximated by a pattern of pixels that can achieve only a limited number of discrete intensities. The most familiar case of this is the rendering of gray tones with black and white pixels, as in a newspaper photograph.

A halftone pattern is made up of a region of pixels referred to as the halftone cell. In conventional digital halftoning (halftoning that uses rational tangent angles), the halftone cell contains a specific, repeatable pattern. The tonal range of a halftone pattern depends upon the number of pixels in the halftone cell.

Pixels are usually arranged on an orthogonal grid, with the pixels placed at evenly spaced lattice points on an output device. A two dimensional array of pixels is often called a pixel map or pixmap. Each pixel in the pixmap has its own unique address on the grid. An image processor uses this address to keep track of each pixel and its associated threshold value.

A threshold value represents the tone value at which the pixel is turned "on." Each pixel within a halftone cell is assigned a threshold value. Typically a threshold array is used to control the individual pixels in a halftone cell. A threshold array can contain one or more halftone cells. The threshold array is replicated and "tiled" (i.e., filled in a non-overlapping manner) over the entire device space. Each pixel in the device space is then mapped to a particular element of the threshold array.

Within any given halftone cell in an image, a certain percentage of the pixels may be "on" and the remaining pixels may be "off." The percentage of pixels that are "on" correspond to the tonal value that the cell represents. For example, if sixty percent of the pixels in a given cell are "on", sixty percent of the pixels in that cell are black and the rest are white. "Black" means solid, or fully saturated. This cell emulates a sixty percent gray tint.

In order to determine whether a pixel is "on" or "off", an imaging device checks a pixel's address, determines the tonal value of the image at that address, and compares the tonal value with the pixel's threshold value in the threshold array. If the tonal value exceeds the threshold value, the pixel is turned "on" when the image is created on the output device.

For each pixel in an image, there is a trade-off between the size of a halftone cell and tonal resolution: the smaller the halftone cell, the smaller the number of pixels it contains, and the fewer tonal values it can represent. Thus, for the best tonal resolution (i.e., the most gray levels), the halftone cell should be large so as to include as many pixels as possible. On the other hand, the bigger the halftone cell, the more visible it becomes to the human eye, distorting the picture at times. This trade-off between number of gray levels and halftone cell size is one of the classic problems of halftoning.

Some color devices, such as color printers, are multi-level devices and have a limited tonal range. Color printers typically have cyan, magenta, yellow and black as the available ink colors. Cyan, magenta and yellow are transparent inks, while black is opaque. Intermediate tones, or varying shades of color, must be represented by halftones. Halftoning in color devices presents added complexity over that of monochromatic imaging.

For example, mechanical misregistration between color planes can cause color shifts. For many types of printers, such as pre-press and inkjet, mechanical misregistration can occur by having the paper feed at an angle, having the paper slide side to side or in the direction of paper movement. This is especially problematic when opaque pixels inadvertently obscure transparent pixels. Mechanical misregistration between color planes can also cause "beat" effects which are known as Moiré patterns. Moiré patterns are interference patterns that can occur when two or more halftone screens are superimposed.

One method used to reduce the effects of mechanical misregistration is to use a halftone screen having a unique frequency and angle for each ink plane. For example, if there are three colors available, one screen may be offset 30 degrees from the underlying screen, and the second screen may be offset 60 degrees from the underlying screen. This solution, however, creates a different type of Moiré pattern, one known as rosettes. Rosettes are undesirable because they impart a low resolution effect on the resulting output. For more information on halftoning, Moiré effects and rosettes, see PostScript™ Screening: Adobe Accurate Screens™ (1992) by Peter Fink, ISBN 0-672-48544-3.

Unlike inkjet and prepress printers, laser printers have only one predominate type of mechanical misregistration, those that occur in the direction of paper movement. Because mechanical misregistration occurs only in the direction of paper movement, the use of line screens allows for controlling the overlap between transparent and opaque inks without using screens placed at different angles from each other. Such line screens place the toner (i.e., ink) in lines that parallel the direction of paper movement. One problem with line screens, however, is that the placement of the lines must be controlled. Also, the lines must be very thin in order to get a sufficient number of gray levels in very light areas. For example, to obtain 256 levels of gray, the thickness of the line must be controllable to at least 1/256 of full line width. Printing very thin lines can be difficult, if not impossible, for laser printers.

When color inks are added to the output, the problems of controlling line placement and line thinness only intensifies. This is especially true for light color areas, because hue shifts can occur. Hue shifts occur when one color fades out too quickly, and are undesirable because hue shifts alter, sometimes significantly, the quality of a color picture.

Therefore, a need exists for a method for halftoning that reduces image artifacts such as Moiré patterns and rosettes. Furthermore, it is desirable that such a method be able to provide the ability to halftone in line screens, cluster dots, or any desired screen pattern.

SUMMARY OF THE INVENTION

A system and method for halftoning multi-level pixels preferably uses a threshold array divided into two or more classes. The classes are ordered in a visitation order. Each class contains at least one element. A halftone cell comprised of a plurality of pixels corresponds to the threshold array. As the intensity level for the halftone cell increases, the pixels corresponding to the elements in the first class are halftoned by fractional values of pixels until all of the pixels in that class reach saturation. As the intensity of the halftone cell increases, none of the pixels corresponding to the elements in any other class change state. Once the pixels corresponding to the elements in the first class are saturated, the pixels corresponding to the elements in the second class are halftoned by fractional values of pixels. In more general terms, the next class in the class visitation order is not addressed until the pixels corresponding to all of the elements in the previous class are saturated.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 1 is a pictorial representation of a prior art threshold array;

FIG. 2 is a pictorial representation of a halftoned cell representing a forty percent black area based upon the threshold array depicted in FIG. 1;

DESCRIPTION OF THE PREFERRED EMBODIMENT

With reference now to the figures and in particular with reference to FIG. 1, a pictorial representation of a prior art threshold array is shown. A halftone cell (not shown) that corresponds to threshold array 100 is a 4×4 cell that contains 16 pixels. Each pixel in the halftone cell is assigned a threshold value. Each threshold value is an element in the threshold array.

Threshold array 100 identifies the order in which the pixels will be filled in as the pixel tonal values increase. Typically halftoning begins with element 0, and as the pixel tonal values increase, additional elements are turned "on" in numerical order. This order of turning pixels "on" is typically called the visitation order.

For example, an area that is 0.4 gray would be halftoned into the pattern illustrated in FIG. 2 on a bi-level device. In the context of FIG. 1, elements in threshold array 100 that have a value of 5 or less are turned "on", and the elements that are greater that 5 are turned "off." The number of elements turned "on" is derived from 16×0.4=6.4, so 6 elements are turned "on." Since this is a bi-level device, the fraction is ignored.

The elements in the threshold array 100 are arranged in a particular manner to create a pattern or screen. The screen for threshold array 100 is one that is known in the art as a cluster dot. A cluster dot is one in which the pixels in the halftone cell are clustered together in order to form halftone dots. Characteristics of cluster dots include halftone screen frequency, screen angle, halftone dot shape and the growth of the halftone dot size with increasing tonal value. All of these parameters influence the appearance of a printed halftone.

Figure 3:
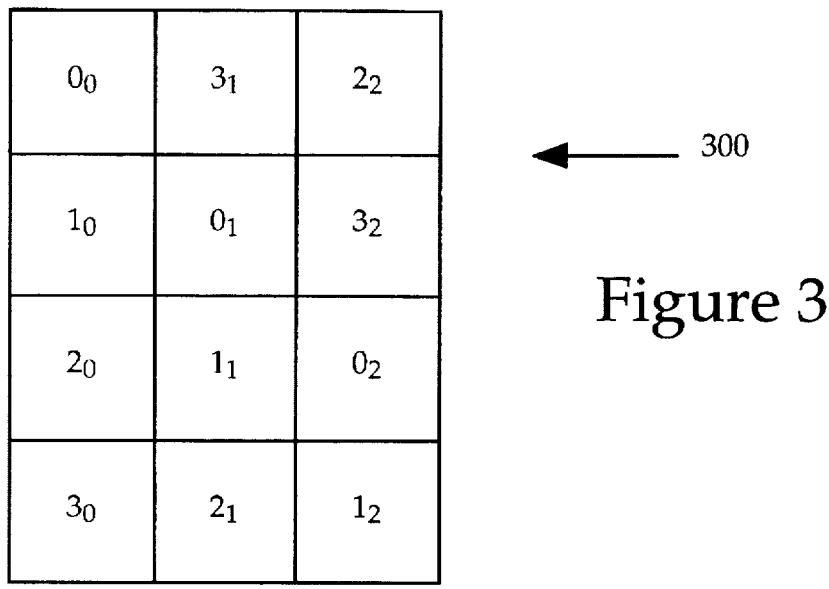
FIG. 3 is a pictorial representation of an exemplary threshold array that can be used to implement the method for halftoning according to the present invention.

FIG. 3 is a pictorial representation of an exemplary threshold array that can be used to implement the method for halftoning according to the present invention. In the preferred embodiment, the pixels in a halftone cell that corresponds to threshold array 300 are multi-level, in that each one is capable of assuming multiple tonal values.

Each element in threshold array 300 has a number with a sub-number contained therein. As discussed with reference to FIG. 1, each number is a threshold value. The sub-number refers to a class, and hereafter will be referred to as a class number. Simply for the purposes of an example, threshold array 300 has three classes, class 0 through class 2. Each class has the same number of elements to further simplify the example. The present invention can be implemented with any number of elements in a class. Furthermore, the number of elements in one class does not have to equal the number of elements in another class.

The class number defines the visitation order for each class in threshold array 300. With prior art threshold arrays, such as the one depicted in FIG. 1, there exists only one class for the entire threshold array. In other words, all of the elements in threshold array 100 are in the same class. Thus, all of the pixels in a halftone cell that corresponds to threshold array 100 are visited sequentially as the pixel tonal values (i.e., intensity of the cell) increase.

Figure 4:
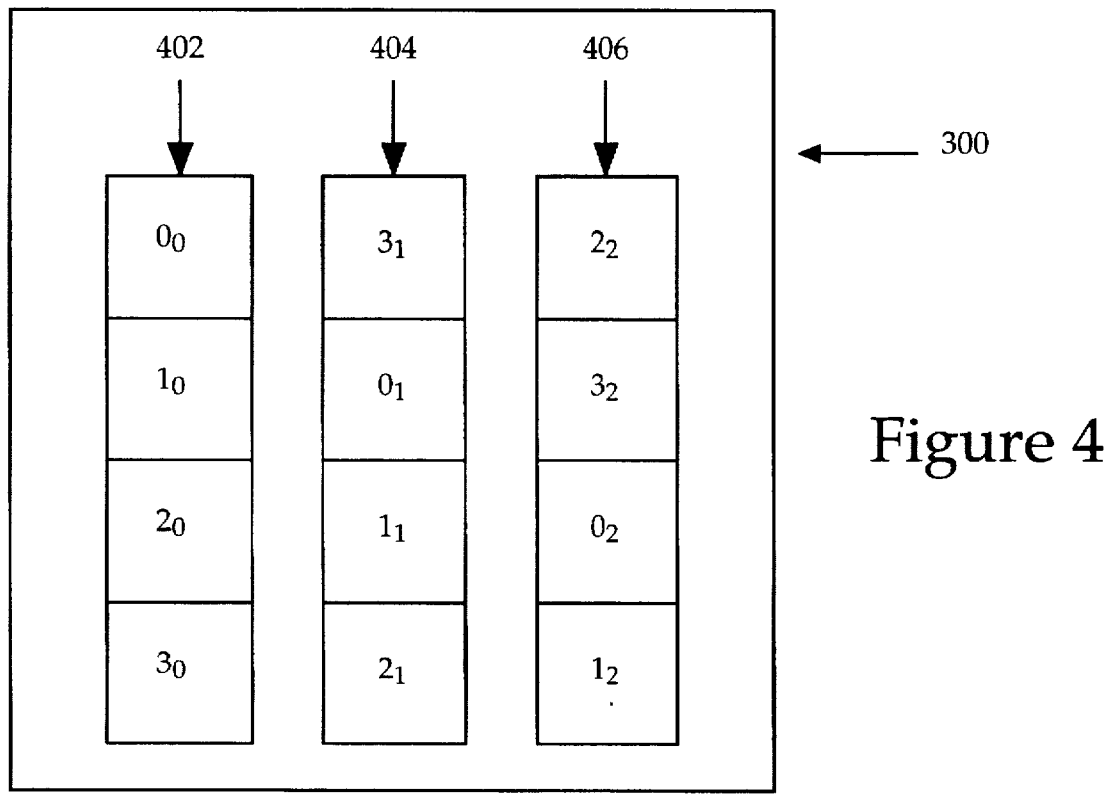
FIG. 4 is a alternative view of FIG. 3 that will be used to describe the method for halftoning according to the present invention.

FIG. 4 illustrates the three classes of FIG. 3 separated from one another. First class 402 is the lowest class. This means that first class 402 is first in the class visitation order. When the pixels corresponding to threshold array 300 are halftoned, all of the pixels associated with the elements in first class 402 must grow to full saturation (ie., black) before any pixel corresponding to the elements in the other classes are allowed to grow. Once the pixels corresponding to first class 402 are at full saturation, the pixels corresponding to second class 404 can assume non-zero pixel tonal values. Finishing up this example, once the pixels corresponding to second class 404 are at full saturation, the pixels corresponding to third class 406 can assume non-zero tonal values.

The threshold values in first class 402 define the visitation order for that class. Thus, element $0_0$ is turned "on" first, possibly by a fractional value, followed by $1_0$, then $2_0$, and finally, $3_0$. Once the pixels associated with these four elements have cycled through all possible pixel tonal values and have reached full saturation, the pixels corresponding to second class 404 can begin to assume non-zero pixel tonal values. As with first class 402, element $0_1$ is turned "on" first, followed by $1_1$, then $2_1$, and finally, $3_1$. Once the pixels corresponding to these four elements have reached full saturation, the pixels corresponding to third class 406 can begin to assume non-zero pixel tonal values. Again, element $0_2$ is turned "on" first, followed by $1_2$, then $2_2$, and finally, $3_2$. Note that the threshold values in each class are arranged in a pattern known in the art as a line screen.

Figure 5:
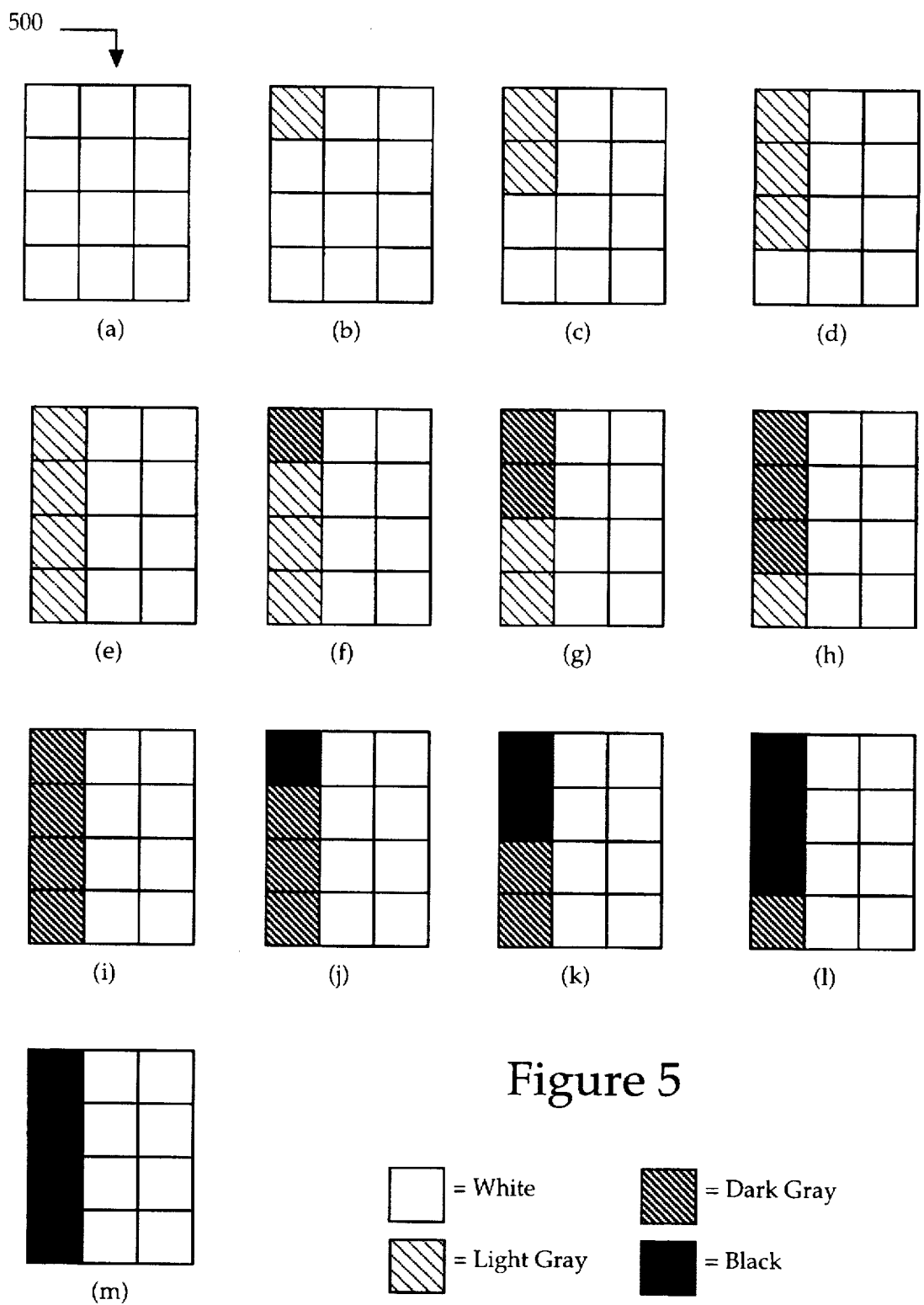
FIGS. 5(a)–5(m) are pictorial representations an exemplary halftone cell that corresponds to the threshold array in FIG. 4, wherein the exemplary halftone cell illustrates a series of halftoning stages according to a method for halftoning according to the present invention.

FIGS. 5(a)–5(m) are pictorial representations of an exemplary halftone cell that corresponds to threshold array 300 in FIG. 4. FIGS. 5(a)–5(m) illustrate a series of halftoning stages according to the present invention. Specifically, FIG. 5 depicts first class 402 in threshold array 300 being halftoned as the pixel tonal values increase. Simply for the purposes of an example, each pixel in halftone cell 500 is capable of assuming four different intensities. These four intensities are white, light gray, dark gray, and black. Those skilled in the art will appreciate, however, that the present invention is not limited to pixels capable of only four intensities. The present invention can be implemented with pixels capable of representing any number of intensities.

Initially the pixels that correspond to threshold array 500 are all white, as shown in FIG. 5(a). FIG. 5(b) illustrates the first pixel assuming a light gray color. This pixel corresponds to element $0_0$ in first class 402. As the intensity of halftone cell 500 increases, the pixel corresponding to element $1_0$ in first class 402 assumes a light gray color. This is shown in FIG. 5(c). As the intensity of halftone cell 500 continues to increase, the pixel corresponding to element $2_0$ in first class 402 assumes a light gray color (see FIG. 5(d)). Finally, as the pixel tonal value increases, the pixel corresponding to element $3_0$ in first class 402 assumes a light gray color.

Now all of the pixels corresponding to first class 402 are a light gray color. Note that as the intensity of halftone cell 500 increased, none of the pixels corresponding to the elements in second class 404 and 406 changed color. Continuing on with this example, the intensity level of halftone cell 500 continues to increase, and the pixel corresponding to element $0_0$ in first class 402 assumes a dark gray color. This is shown in FIG. 5(f). As the intensity of halftone cell 500 continues to increase, the pixels corresponding to elements $1_0$ through $3_0$ assume a dark gray color in visitation order. These stages are illustrated in FIG. 5(g) through FIG. 5(i).

Now all of the pixels corresponding to first class 402 are a dark gray color. Again, as the intensity of halftone cell 500 increased, none of the pixels in second class 404 or third class 406 changed color. Instead, the pixels corresponding to first class 402 became more saturated.

As the intensity level of halftone cell 500 continues to increase, element $0_0$ in first class 402 becomes fully saturated, which in this example is the color black. This is shown in FIG. 5(j). And as the intensity of halftone cell 500 continues to increase, the pixels corresponding to elements $1_0$ through $3_0$ become black in visitation order. These stages are illustrated in FIG. 5(k) through FIG. 5(m). Now all of the pixels corresponding to first class 402 are fully saturated, and the halftoning method moves onto the next class.

Figure 6:
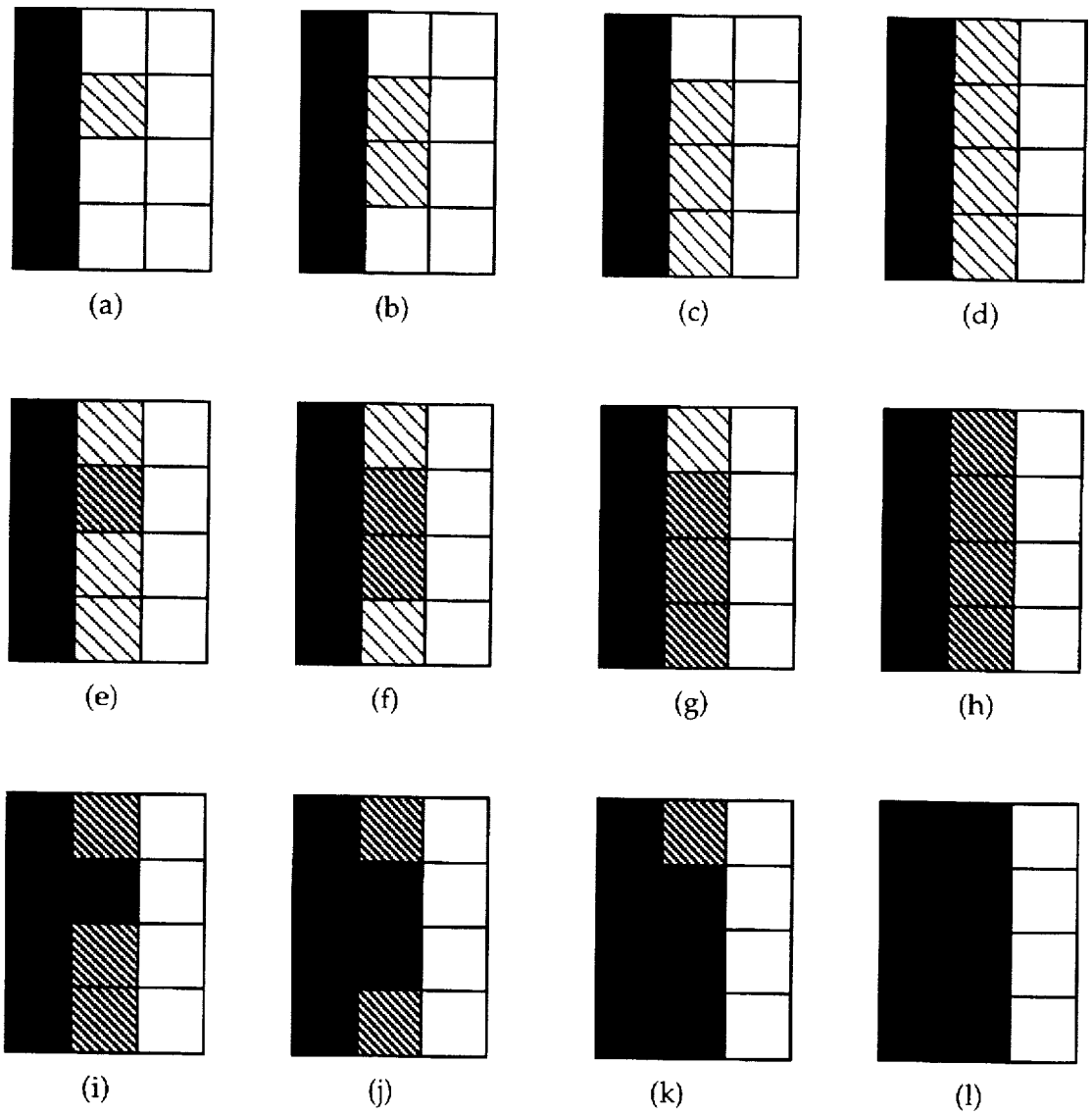
FIGS. 6(a)–6(l) are pictorial representations of an exemplary halftone cell that corresponds to the threshold array in FIG. 4, wherein the exemplary halftone cell illustrates a series of halftoning stages according to a method for halftoning according to the present invention.
Figure 7:
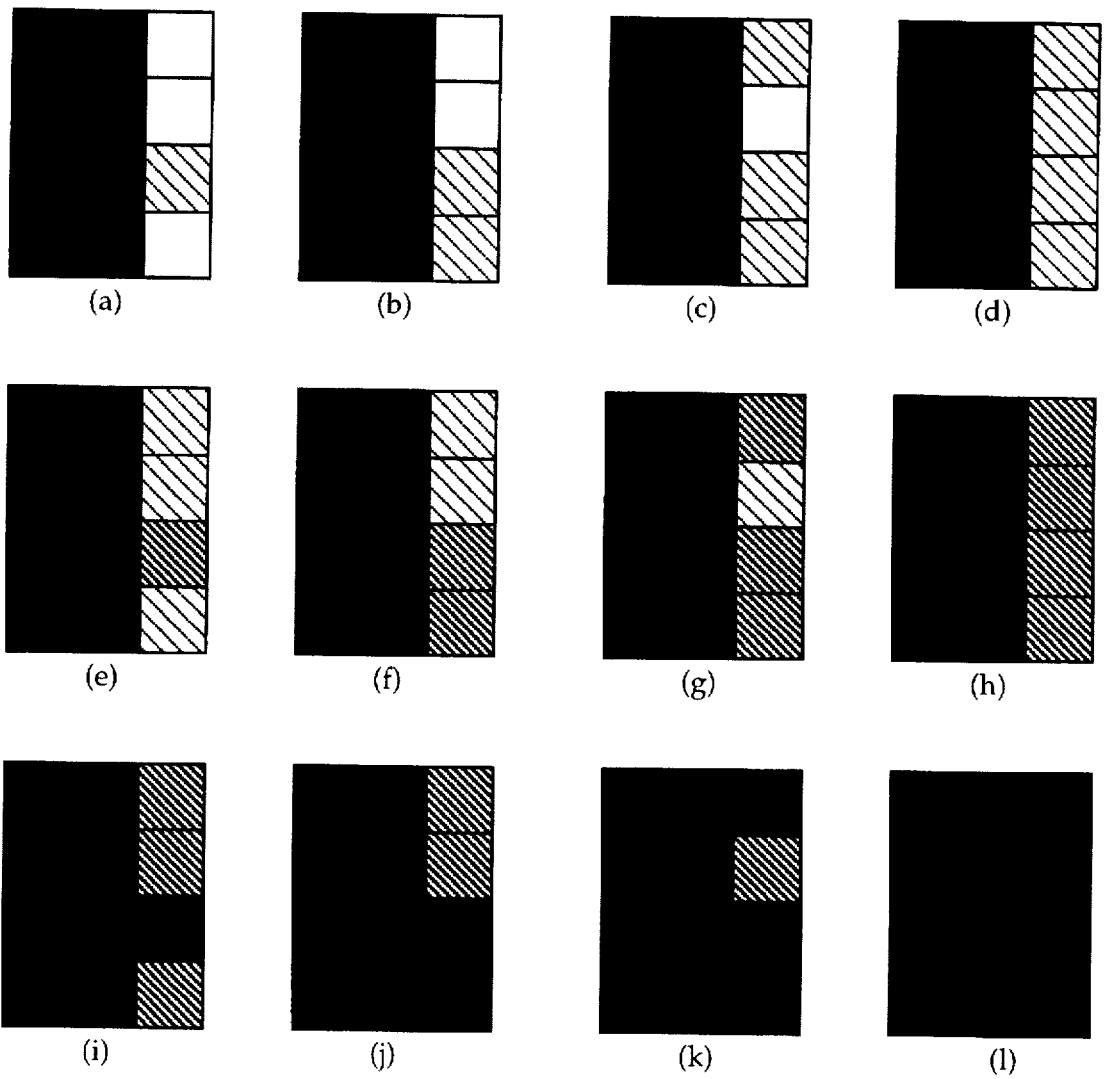
FIGS. 7(a)–7(l) are pictorial representations of an exemplary halftone cell that corresponds to the threshold array in FIG. 4, wherein the exemplary halftone cell illustrates a series of halftoning stages according to a method for halftoning according to the present invention.

FIGS. 6(a)–6(l) are pictorial representations of an exemplary halftone cell that corresponds to threshold array 300. FIGS. 6(a)–6(l) illustrate a series of halftoning stages according to the present invention. Specifically, FIG. 6 depicts all of the pixels that correspond to first class 402 at full saturation, and the pixels corresponding to second class 404 in threshold array 300 in various halftoned stages. FIG. 6(a) illustrates the pixel corresponding to element $0_1$ in second class 404 assuming a light gray color. As the intensity of halftone cell 500 increases, the pixel corresponding to element $1_1$ in second class 404 assumes a light gray color. This is shown in FIG. 6(b). As the intensity of halftone cell 500 continues to increase, the pixel corresponding to element $2_1$ in first class 402 assumes a light gray color, followed by the pixel corresponding to element $3_1$ (see FIGS. 6(c)–6(d)). Now all of the pixels corresponding to second class 404 are a light gray color. Note that as the intensity of halftone cell 500 increased, none of the pixels corresponding to the elements in third class 406 changed color.

Continuing on with this example, the intensity level of halftone cell 500 continues to increase, and the pixel corresponding to element $0_1$ in second class 404 assumes a dark gray color. This is shown in FIG. 6(e). As the intensity of halftone cell 500 continues to increase, the pixels corresponding to elements $1_1$ through $3_1$ assume a dark gray color in proper visitation order.

These stages are illustrated in FIG. 6(f) through 6(h).

Now all of the pixels that correspond to second class 404 are a dark gray color. Again, as the intensity of halftone cell 500 increased, none of the pixels in third class 406 changed color. Instead, the pixels corresponding to second class 404 became more saturated.

Eventually, with the intensity level of halftone cell 500 increasing, the pixel corresponding to element $0_1$ in second class 404 becomes black. This is shown in FIG. 6(i). And, in visitation order, the pixels corresponding to elements $1_1$ through $3_1$ become black. These stages are illustrated in FIGS. 6(j) through 6(l). Now all of the pixels that correspond to second class 404 are fully saturated, and the halftoning method moves onto the next class in the class visitation order.

FIGS. 7(a)–7(l) are pictorial representations of an exemplary halftone cell that corresponds to threshold array 300. FIGS. 7(a)–7(l) illustrate a series of halftoning stages according to the present invention. Specifically, FIG. 7 depicts all of the pixels corresponding to first and second class 402, 404 at full saturation, and the pixels corresponding to third class 406 in threshold array 300 in various halftoned stages.

As the intensity of halftone cell 500 increases, FIG. 7(a) illustrates the pixel corresponding to element $0_2$ in third class 406 assuming a light gray color. Next, the pixel corresponding to element $1_2$ assumes a light gray color. This is shown in FIG. 7(b). As the intensity of halftone cell 500 continues to increase, the pixels corresponding to elements $2_2$ and $3_2$ in third class 406 assume a light gray color (see FIGS. 7(c)–7(d)). Now all of the pixels corresponding to third class 406 are a light gray color.

As the intensity of halftone cell 500 increases, the pixel corresponding to element $0_2$ in third class 406 assumes a dark gray color. This is shown in FIG. 7(e). As the intensity of halftone cell 500 continues to increase, the pixels corresponding to elements $1_2$ through $3_2$ assume a dark gray color in their visitation order. These stages are illustrated in FIG. 7(f) through 7(h). As the intensity level of halftone cell 500 continues to increase, the pixels corresponding to elements $0_2$ through $3_2$ in third class 406 become black. These stages are shown in FIGS. 7(i)–7(l). Now all of the pixels in halftone cell 500 are saturated.

Figure 8:
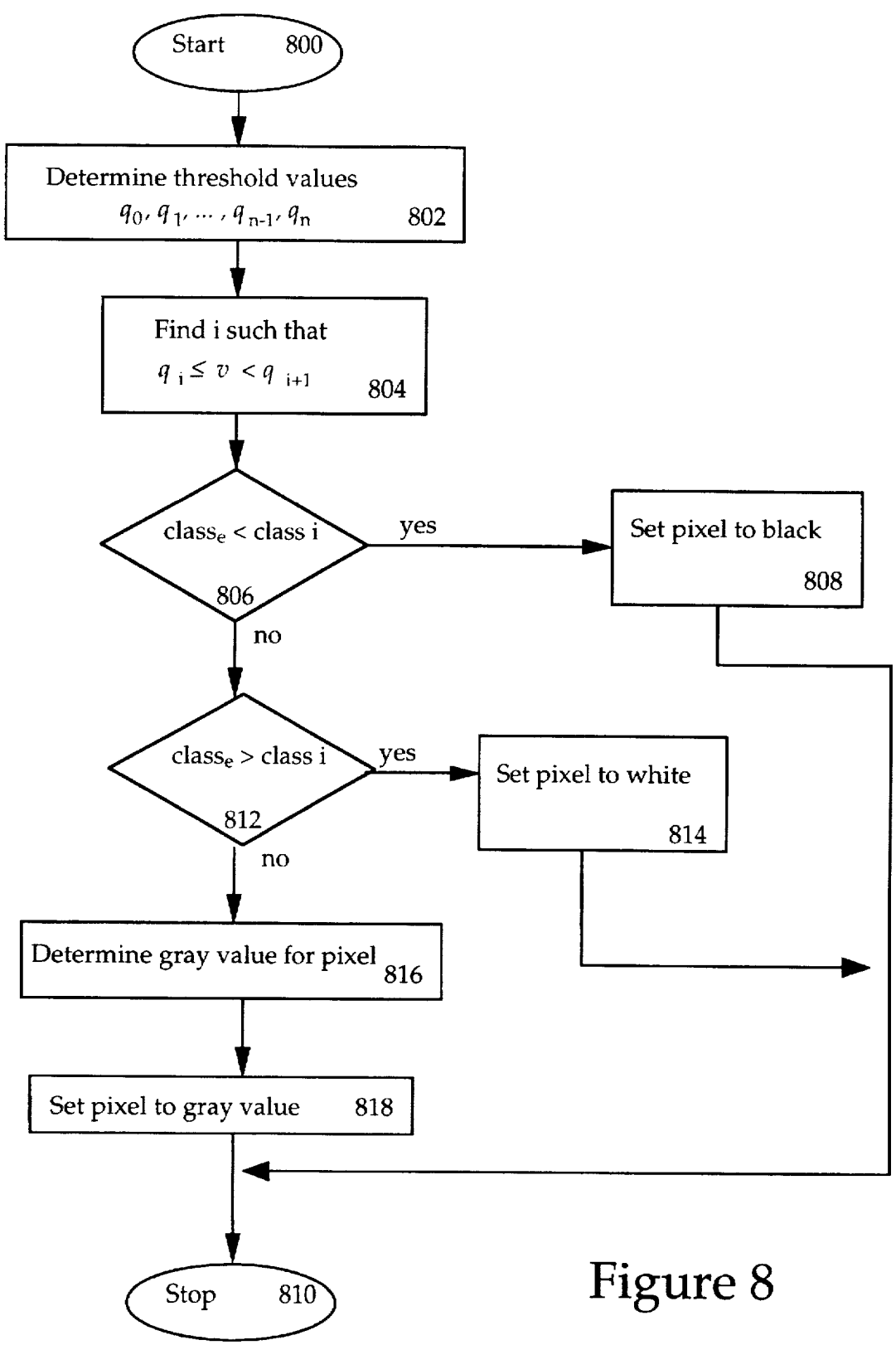
FIG. 8 is a flowchart illustrating a preferred method for halftoning according to the present invention.

Referring to FIG. 8, a flowchart illustrates a preferred method for halftoning according to the present invention. The method depicted in FIG. 8 must be performed for each pixel in the image. The method begins at block 800, and thereafter passes to block 802. Block 802 depicts the step of determining threshold array values, $q_0, q_1, \ldots, q_n$, to apply to each of the classes (n classes) in a threshold array. The value $q_0$ is a threshold value where all pixels in a halftone cell that correspond to the first class within the threshold array have reached full saturation and pixels in the next class have not yet started to grow. The value $q_1$ is a threshold value where all of the pixels in the second class are turned "on" while the pixels in the next class are turned "off", and so on. $q_n$ is the intensity value where all of the pixels in the halftone cell are saturated. In the preferred embodiment, $q_0 < q_1 < \ldots < q_n$.

Note that the threshold values can be expressly defined or defined as an equation. One example of an equation is $p = k(q-1)$, where p is the number of gray values in a class, k is the number of pixels in a particular class, and q is the number of gray levels per pixel in a particular class. It is also possible to expressly define the values in an equation. This can be done when additional control of the tonal reproduction curve is desired. The threshold values can be pre-computed or computed while halftoning is being performed.

Next, for a given intensity value (v) for the halftone cell, a class ($c_i$) is found such that $q_i \leq v < q_{i+1}$. This step is illustrated in block 804. One technique that can be used to implement this is to step through each value of i, starting at zero, until the condition is met. Once the class is determined, the threshold array element (e) corresponding to the pixel position of the pixel being halftoned is determined.

A determination is then made as to whether or not the threshold array element (e) is located in a class ($class_e$) having a class visitation number below class i. This step is shown in block 806. If the element is in a class having a class visitation number below class i, according to the present invention that pixel would have already reached saturation. Therefore, the pixel is saturated (i.e., set to black), as depicted in block 808. The method then passes to block 810, and the method ends.

If the element is not in a class with a lower visitation number, a determination is made as to whether or not the element is located in a class that is visited after class i in terms of visitation order. In other words, threshold array element (e) is located in a class having a class visitation number above class i. This step is shown in block 812. If the element is in a class having a class visitation number above class i, the pixel is set to white, as illustrated in block 814. The method then passes to block 810, and the method ends.

If the element is not in a class having a class visitation number above or below class i, that means the element is in class i. The gray value for that pixel is then determined, and the color of the pixel is then set to that gray level. These two steps are shown in blocks 816 and 818, respectively. The method then passes to block 810, where the method ends.

Figure 9:
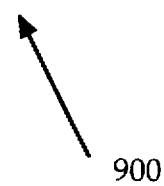
FIG. 9 is a pictorial representation of a collection of halftone cells that may be used according to the present invention.

FIG. 9 is a pictorial representation of a collection of halftone cells that may be used according to the present invention. FIG. 9 consists of four 4×4 arrays similar to the one depicted in FIG. 3. Another implementation of the present invention can employ what is known in the art as a supercell. A supercell is a collection of halftone cells with a certain ordering to the pixels. Thus, the elements in a class can be adjacent to one another or distributed throughout the supercell in a particular pattern.

Figure 10:
FIG. 10 is a pictorial representation of an exemplary threshold array that can be used to implement the method for halftoning according to the present invention.

Referring to FIG. 10, a pictorial representation illustrates an exemplary threshold array that may be used to implement the method for halftoning according to the present invention is shown. Threshold array 1000 contains four classes having four elements each. The classes and elements are organized in a cluster dot pattern. Thus, the present invention can be implemented with any screen pattern for a halftone cell or supercell.

Figure 11:
FIG. 11 is a pictorial representation of an exemplary threshold array that can be used to implement the method for halftoning according to the present invention.

FIG. 11 is a pictorial representation of an exemplary threshold array that can be used to implement the method for halftoning according to the present invention. Threshold array 1100 has eight classes of varying sizes. Classes 0 and 1 each consist of two elements. Classes 2 and 3 have four elements per class. Finally, classes 4 through 7 each have one element in a class. Threshold array 1100 illustrates how a threshold array can contain multiple classes of varying size.

Another noteworthy aspect to threshold array 1100 is that the values of the elements in threshold array 1100 are of differing values. Classes that have the same number of elements do not necessarily have to grow in the same stages. Nor do the elements in a particular class have to have threshold array values that are in sequential order. For example, the elements in class 2 have threshold array values of 0, 1, 2, and 3, while class 3 elements have threshold array values of 0, 2, 4, and 6. Thus, the present invention allows a threshold array or supercell to be configured in any desired manner.

Figure 12:
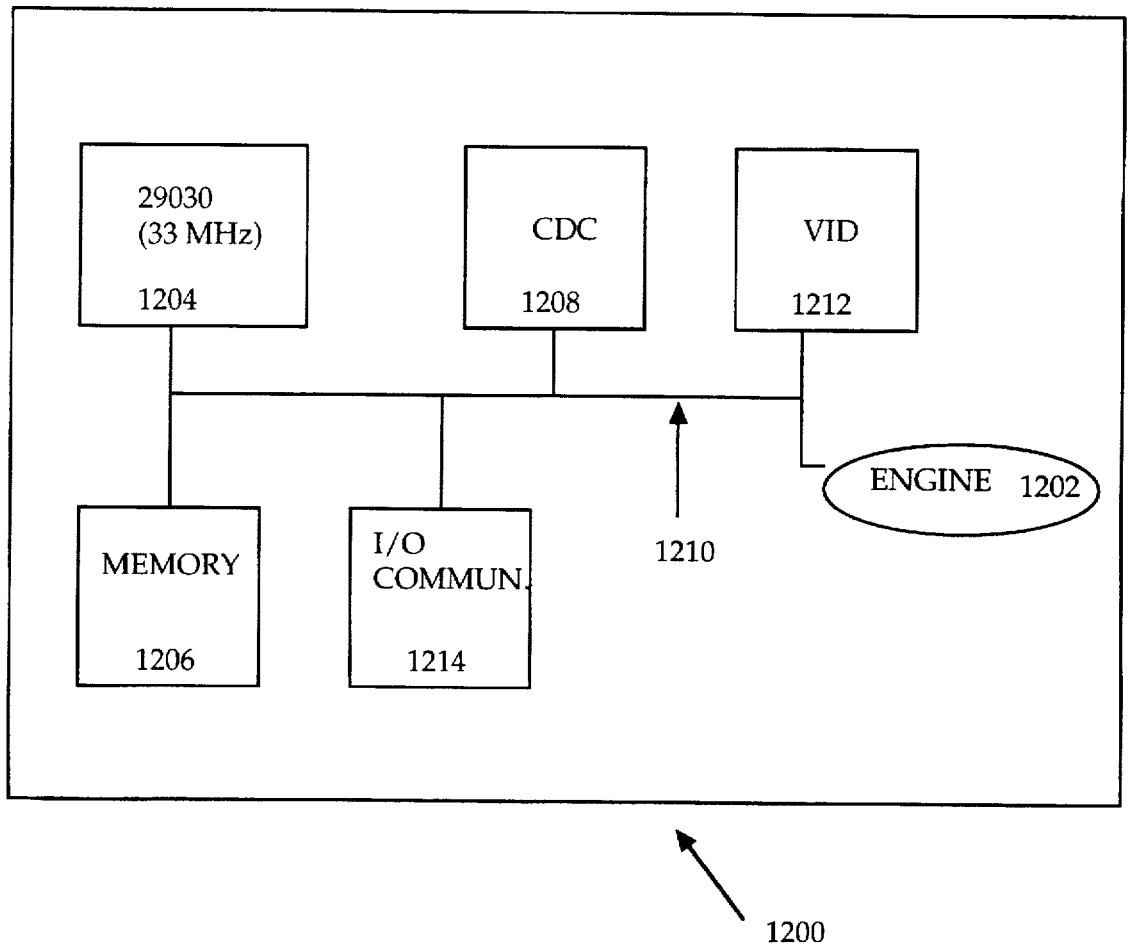
FIG. 12 is a high level block diagram of a preferred apparatus that may be used to implement the preferred method for halftoning according to the present invention.

Referring to FIG. 12, a high level block diagram depicts a preferred apparatus that may be used to implement the preferred method for halftoning according to the present invention. FIG. 12 illustrates a printing system 1200 which incorporates features of the present invention. Printing system 1200 includes a color laser engine 1202, such as any commercially available color laser marking engine. For purposes of the current discussion, the term "color" includes the use of multiple colors (such as cyan, magenta, and yellow), as well as gray scale printing using varying shades of gray.

Printing system 1200 includes a processor, represented in FIG. 12 as printing system controller 1204 having associated memory 1206. Printing system controller 1204 can be a reduced instruction set computer (RISC) such as the 33 Megahertz 29030 processor available from Advanced Micro Devices. Printing system controller 1204 performs such functions as scaling, partitioning, resampling, and filtering in the preferred embodiment.

Printing system 1200 also includes a compression/ decompression coprocessor (CDC) 1208. CDC coprocessor 1208 compresses image data in order to substantially reduce the memory requirements needed to store image data. However, if cost is not a concern, CDC coprocessor 1208 can be left out completely in a color printing system. CDC coprocessor 1208 can, for example, be formed as a monolithic application specific integrated circuit (ASIC). Those skilled in the art, however, will appreciate that the processing implemented by CDC coprocessor 1208 can be performed by the same processor for printing system controller 1204.

Once image data is compressed and stored in memory by CDC coprocessor 1208, it can subsequently be transferred to printer engine 1202 via system bus 1210 and video interface device (VID) 1212. VID 1212 provides high quality reproduction of the original image from its compressed format. VID 1212 may, for example, be formed as a separate ASIC having a decompression processor to support decompression and halftoning. Alternatively, a single processor can be used to implement the functions of printing system controller 1204, CDC coprocessor 1208, and VID 1212.

Printing system 1200 further includes an input/output (I/O) communications device 1214. I/O communications device 1214 may include, for example, built-in networking support as well as parallel/serial I/O ports. I/O communications device 1214 can also include additional memory as well as memory expansion ports.

Figure 13:
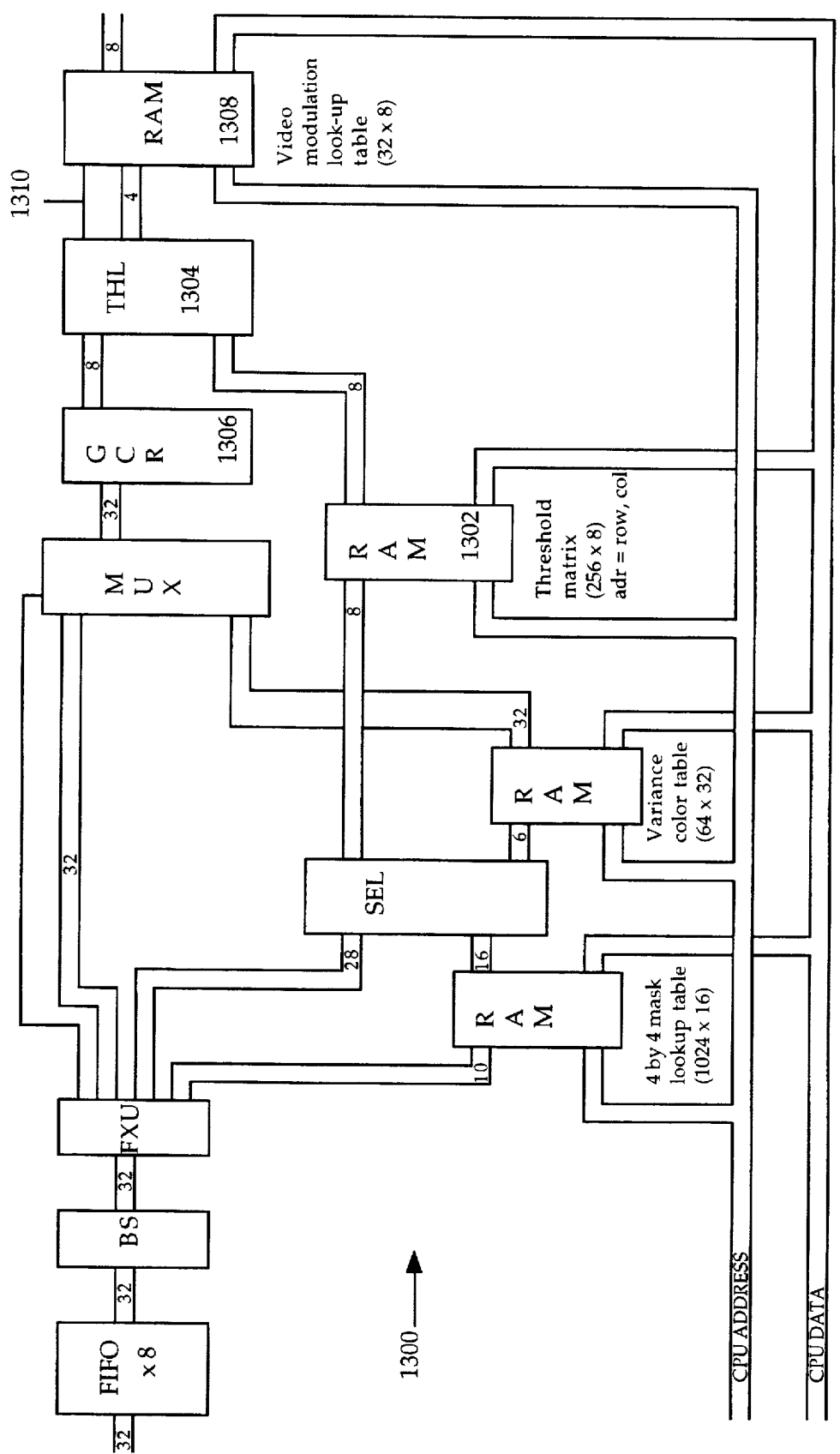
FIG. 13 is a more detailed block diagram of a portion of block 1212 in FIG. 12 for implementing the method for halftoning according to the present invention.

FIG. 13 is a more detailed block diagram of a portion of block 1212 in FIG. 11 that may be used to implement the method for halftoning according to the present invention. In particular, FIG. 13 depicts a portion of a decompression apparatus 1300 according to the present invention. For clarity, only the blocks relevant to halftoning will be described.

The threshold arrays of the preferred embodiment are stored in threshold memory 1302. 4-bits output from a separate modulo-m row counter and 4-bits output from a separate modulo-n counter are used to address threshold memory 1302. The values of m and n are preferably selected independently as a number between 1 and 16, m and n being determined by the desired height of the threshold array and desired width of the threshold array, respectively. An 8-bit output from threshold memory 1302 is provided for each pixel in the threshold array to threshold logic 1304, along with an 8-bit output from gray component removal block 1306. Gray component removal block 1306 performs gray component removal, a process known in the art.

Threshold logic block 1304 halftones the 8-bit input pixel so that the resulting halftoned value is a 4-bit multi-level output value per pixel. The 4-bit gray output value is supplied as an input to video modulation look-up table 1308.

Video modulation look-up table 1308 is used to convert the 4-bit gray output value to a data format for use by the color laser marking engine. Depending on the color laser marking engine, the data format can be a serial video for direct sub-pixel modulation of the laser diode, or 8-bit parallel video to a continuous tone interface.

Video modulation look-up table 1308 preferably has thirty-two entries. The first sixteen of which are used for isolated pixels that do not have a black (i.e. fully saturated) pixel to the left or right. The second sixteen entries are used for pixels that have a black pixel adjacent to it (as identified by the most significant bit, labeled address line 1310). This scheme is used because most print engines have different transfer characteristics for a single gray pixel and for a gray pixel connected to a black pixel. Because exemplary embodiments of the present invention include less than a full scan line buffer, this technique is applied only in the horizontal direction.

One of the advantages to the present invention is that it is sufficiently general in nature that it can be used with any type of halftoning. For example, if there is one class only, and the pixels are bi-level, the present invention describes traditional bi-level halftoning that is known in the art.

Alternatively, if there is one class only and the pixels are multi-level, the present invention describes multi-level halftoning disclosed in our co-pending application, Ser. No. 08/397,601, filed on Mar. 2, 1995 and entitled "Method and Apparatus for Color Halftoning", and our second co-pending application, Ser. No. 08/396,828, filed on Mar. 2, 1995 and entitled "Method and Apparatus for Color Halftoning".

Another alternative is to perform halftoning using the present invention with multiple classes and bi-level pixels. This type of halftoning is known in the art as "supercell" screening or dithering of halftone cells. One example of this type of halftoning can be found in a LaserWriter 16/600 PS printer by Apple Computer, Inc. of Cupertino, Calif.

The present invention discloses a fourth alternative, which is to perform halftoning with multiple classes and multi-level pixels.

Another advantage to the present invention is that it can be used to create any desired screen pattern. By determining the number of classes, their visitation order, and the threshold values for each class, any screen pattern can be created.

The presently disclosed embodiments are intended to be illustrative in all respects, rather than restrictive, of the present invention. It will be understood by those skilled in the art that various changes in form and detail may be made therein without departing from the spirit and scope of the invention.

What is claimed is:

1. A method for halftoning multi-level pixels in a halftone cell that corresponds to a threshold array divided into two or more classes, wherein the classes are ordered in a visitation order, and wherein each class contains at least one element having an associated threshold value, said method comprising the step of determining the intensity of a particular pixel based upon the location of its corresponding element in the class visitation order and the threshold value assigned to the element.

2. A method for halftoning multi-level pixels in a halftone cell using a threshold array containing a plurality of threshold values ($q_n$), wherein the threshold array is divided into two or more classes (n), and wherein each class contains at least one element, said method comprising the steps of:

for a particular intensity level (v) for the halftone cell, determining a class i such that $q_i \leq v < q_{i+1}$;

locating a position for an element in the threshold array that corresponds to a pixel being halftoned, wherein a particular class is determined based upon the position of the element;

setting the pixel being halftoned to a particular intensity based upon its corresponding threshold value and a class visitation order.

3. A system for halftoning multi-level pixels, comprising:

at least one halftone cell that corresponds to a threshold array divided into two or more classes, wherein the classes are ordered in a visitation order, and wherein each class contains at least one element having an associated threshold value; and means for determining the intensity of a particular pixel based upon the location of its corresponding element in the class visitation order and the threshold value assigned to the element.

4. The method of claim 1, wherein the halftone cell is included in a supercell.

5. The method of claim 1, wherein the halftone cell is utilized to implement a screen pattern.

6. The method of claim 1, wherein the two or more classes contains an equal number of elements.

7. The method of claim 6, wherein the class visitation order is incremented by the same value for each element in each class.

8. The method of claim 6, wherein the class visitation order is incremented by any value for each element in each class.

9. The method of claim 1, wherein the two or more classes contains a varying number of elements.

10. The method of claim 9, wherein the class visitation order is incremented by the same value for each element in each class.

11. The method of claim 9, wherein the class visitation order is incremented by any value for each element in each class.

12. The method of claim 1, wherein each threshold value associated with each element in a class is incremented by the same value.

13. The method of claim 1, wherein each threshold value associated with each element each element in a class is incremented by any value.

14. The method of claim 2, wherein the halftone cell is included in a supercell.

15. The method of claim 2, wherein the halftone cell is utilized to implement a screen pattern.

16. The method of claim 2, wherein the two or more classes contains an equal number of elements.

17. The method of claim 16, wherein the class visitation order is incremented by the same value for each element in each class.

18. The method of claim 16, wherein the class visitation order is incremented by any value for each element in each class.

19. The method of claim 2, wherein the two or more classes contains a varying number of elements.

20. The method of claim 19, wherein the class visitation order is incremented by the same value for each element in a class.

21. The method of claim 19, wherein the class visitation order is incremented by any value for each element in a class.

22. The method of claim 2, wherein each threshold value associated with each element in a class is incremented by the same value.

23. The method of claim 2, wherein each threshold value associated with each element in a class is incremented by any value.

24. The system of claim 3, wherein the at least one halftone cell is included in a supercell.

25. The system of claim 3, wherein the at least one halftone cell is utilized to implement a screen pattern.

26. The system of claim 3, wherein the two or more classes contains an equal number of elements.

27. The system of claim 26, wherein the class visitation order is incremented by the same value for each element in each class.

28. The system of claim 26, wherein the class visitation order is incremented by any value for each element in each class.

29. The system of claim 3, wherein the two or more classes contains a varying number of elements.

30. The system of claim 29, wherein the class visitation order is incremented by the same value for each element in each class.

31. The system of claim 29, wherein the class visitation order is incremented by any value for each element in each class.

32. The system of claim 3, wherein each threshold value associated with each element in a class is incremented by the same value.

33. The system of claim 3, wherein each threshold value associated with each element in a class is incremented by any value.

* * * * *